United States Patent [19]

Nourbakhsh et al.

[11] Patent Number: 5,039,837

[45] Date of Patent: Aug. 13, 1991

[54] PLASMA TORCH HEAD, BODY, HANDLE AND CONTROL CIRCUITRY

[75] Inventors: Farhad Nourbakhsh, Watertown; Corwin L. Namken, Hayti, both of S. Dak.

[73] Assignee: Tescom Corporation, Elk River, Minn.

[21] Appl. No.: 485,155

[22] Filed: Feb. 23, 1990

[51] Int. Cl.[5] .......... B23K 9/00

[52] U.S. Cl. .......... 219/121.48; 219/121.50; 219/121.52; 219/75

[58] Field of Search .......... 219/121.36, 121.48, 219/121.5, 121.51, 121.52, 74, 75, 76.16; 313/231.31, 231.41

[56] References Cited

U.S. PATENT DOCUMENTS

| | | | |
|---|---|---|---|
| 4,311,897 | 1/1982 | Yerushalmy | 219/121.5 |
| 4,625,094 | 11/1986 | Marhic et al. | 219/121.51 |
| 4,650,956 | 3/1987 | Marhic et al. | 219/121.5 |
| 4,769,524 | 9/1988 | Hardwick | 219/121.48 |
| 4,777,343 | 10/1988 | Goodwin | 219/121.5 |

*Primary Examiner*—M. H. Paschall
*Attorney, Agent, or Firm*—Clayton R. Johnson

[57] ABSTRACT

Disclosed herein a plasma torch that includes a torch body that at its upstream portion is adapted for being removably retained in a plurality of laterally adjusted positions by one lateral end position of a handle. The opposite end of the torch body is joined to the head to extend at an obtuse angle. The head includes an adaptor and an electrode having axial portion coaxially arranged to an air tube and at least parts of the combination of the torch shell and the nozzle to provide a cooling air path to flow downwardly through the tube, thence upwardly around the tube and thence downwardly to primarily discharge downwardly through the shell and in part through the nozzle. A stand and holder are mounted on the shell to hold the nozzle spaced from the cutting surface. The handle has a pair of switches connected in series and positioned to prevent accidently starting the cutting operation, i.e. located on the handle top and bottom half portions respectively such that the user when holdingly using the torch with one hand, the thumb moves and retains the trigger switch in a closed condition and at least one of the ring finger and little finger of the same hand moves and retains the interlock switch in a closed position. Also a wrench interlock switch is connected in series with the above switches and retained in a closed position by a torch wrench.

31 Claims, 10 Drawing Sheets

PLASMA TORCH HEAD, BODY, HANDLE AND CONTROL CIRCUITRY

Disclosed is torch and in particular a plasma torch, torch handle and control circuitry.

U.S. Pat. No. 4,311,897 to Yerushalmy discloses a plasma torch having a central water tube through which water flows downwardly, thence upwardly outside of the tube and then downwardly through a passage to an annular channel in the nozzle to surround the plasma arc. The torch also has a gas passage that opens to the nozzle outlet.

U.S. Pat. No. 4,024,373 to Bykhovsky discloses a plasma torch that in FIG. 3 has a tube through which a gas flows downwardly and thence upwardly around the tube to flow radially into an annular chamber. From the chamber the gas can in part flow through a gas permeable partition and through the nozzle outlet and in part radially through passages to a second chamber that in part surrounds the nozzle to discharge to the atmosphere, apparently at least in part through axial passages.

U.S. Pat. No. 4,777,342 to Hafner discloses a plasma torch having an insulating ring for retaining one electrode member concentrically within a second electrode member.

FIG. 2 of U.S. Pat. No. 4,791,268 shows a torch body encapsulating the downstream end portion of an air conduit and an electric conductor.

In order to provide improvements in torches such as the above as well as for other types of torches, this invention has been made.

SUMMARY OF THE INVENTION

The plasma torch disclosed herein has a torch head having an air tube mounted by an electrode adaptor and extended into an electrode in radial spaced relationship to permit air flow upwardly between the adaptor and the air tube to the axial chamber defined by the air, tube electrode and adaptor. The above chamber at its upper end opens through the adaptor to a second chamber radially between the shell and adaptor to flow downwardly to in part discharge through the nozzle outlet and primarily through passages in the shell to flow downwardly around the lower part of the nozzle and onto the surface being cut. The torch head is of a construction to permit easily changing the electrode.

Advantageously the torch head is joined to the lateral torch body which in turn is removably mounted in a plurality laterally adjusted positions by the torch handle. Also, advantageously, the handle mounts a pair of switches that are located such that normally when holding the torch with one hand, two small fingers of the hand line up with one switch button and the other switch button that when pushed by the thumb, starts the cutting operation, i.e. a safety feature.

One of the objects of this invention is to provide a new and novel plasma torch of a relative simple construction, and designed to provide better viewing of the area being cut and easily replacing the electrode. Another object of this invention is to provide new and novel means on the lateral torch body and the handle to permit selectively adjusting the body relative to the handle for allowing positioning the torch head relative to the handle to make easier access to tight corners and adjustably varying the nozzle relative to the hand holding the torch. Still another object of the invention is to provide new and novel means for controlling the operation of the torch to minimize inconvenience to the user and at the same time avoid accidentally energizing the torch for starting the cutting operation.

A different object of the invention is to provide new and novel switch apparatus to prevent accidentally energizing the torch when removing at least one of the nozzle and electrode. Another object of this invention is provide new and novel means for retaining the electrode adaptor and shell of the torch head in concentric relationship. An additional object of the invention is to provide new and novel means for decreasing the possibility of a short between an air conduit and an electric connector in a plasma torch. A further object of the invention is to provide new and novel means for spacing the torch head of a plasma torch from the surface of the material to be cut.

Figure 1:
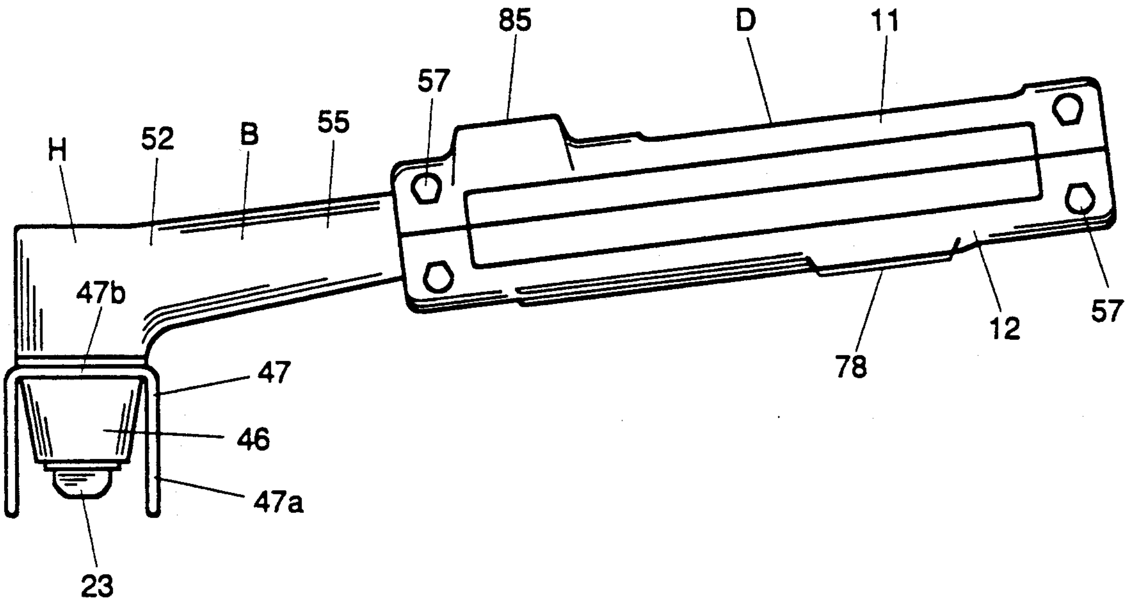
FIG. 1 is a side view of the torch of this invention.
Figure 2:
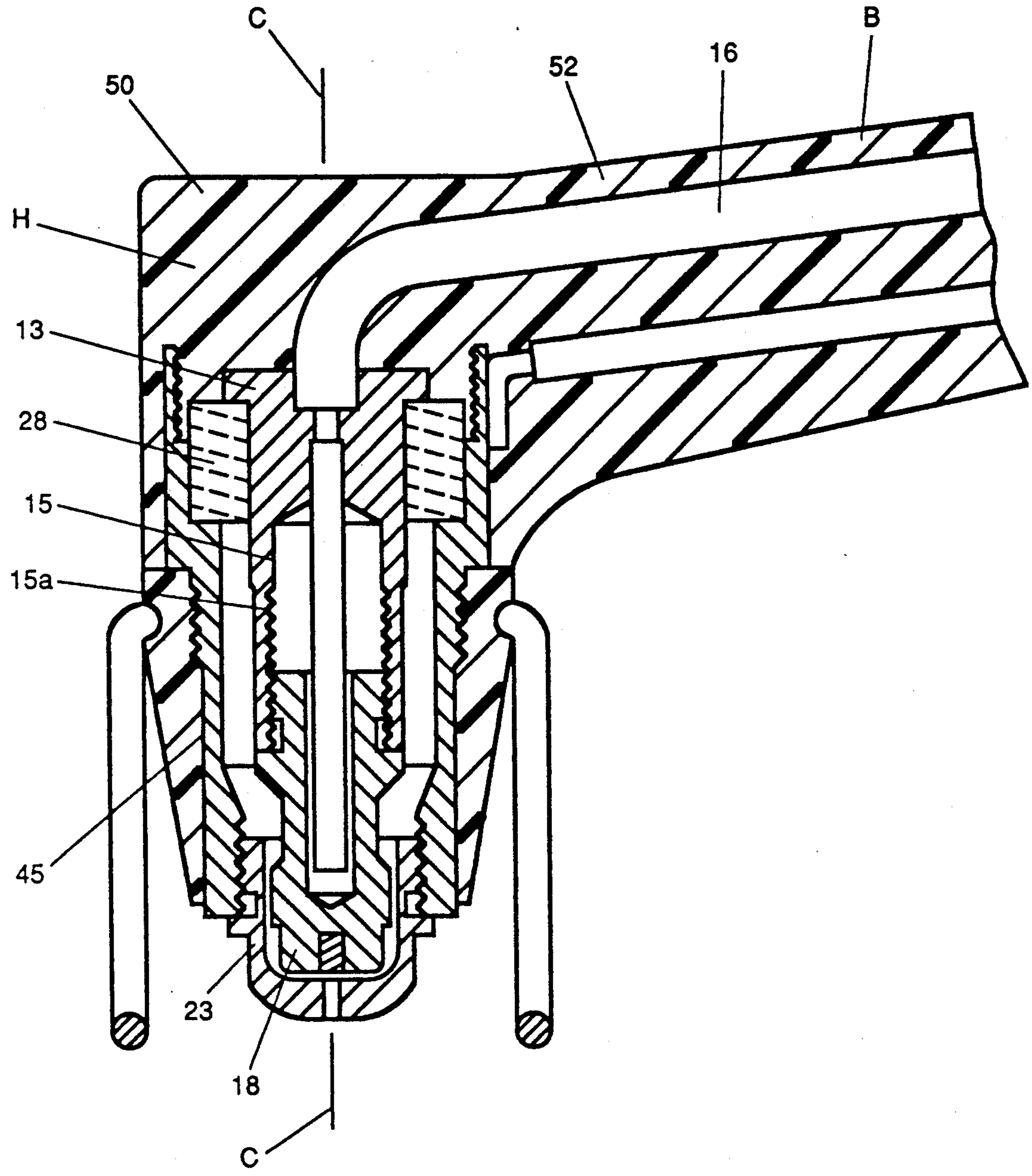
FIG. 2 is a cross sectional view through the torch head and the adjacent part of the torch body: the air passages between the first and second chambers and the lower discharge passages in the shell not being shown.

Referring now in particular to FIGS. 1 and 2, the torch of this invention includes a torch head H that at its upper end is joined to the downstream end of the laterally elongated torch body B. The upstream end of the torch body is laterally adjustable relative to the laterally elongated handle D and is removably clamped between the upper and lower handle sections 11 and 12 respectively.

Figure 3:
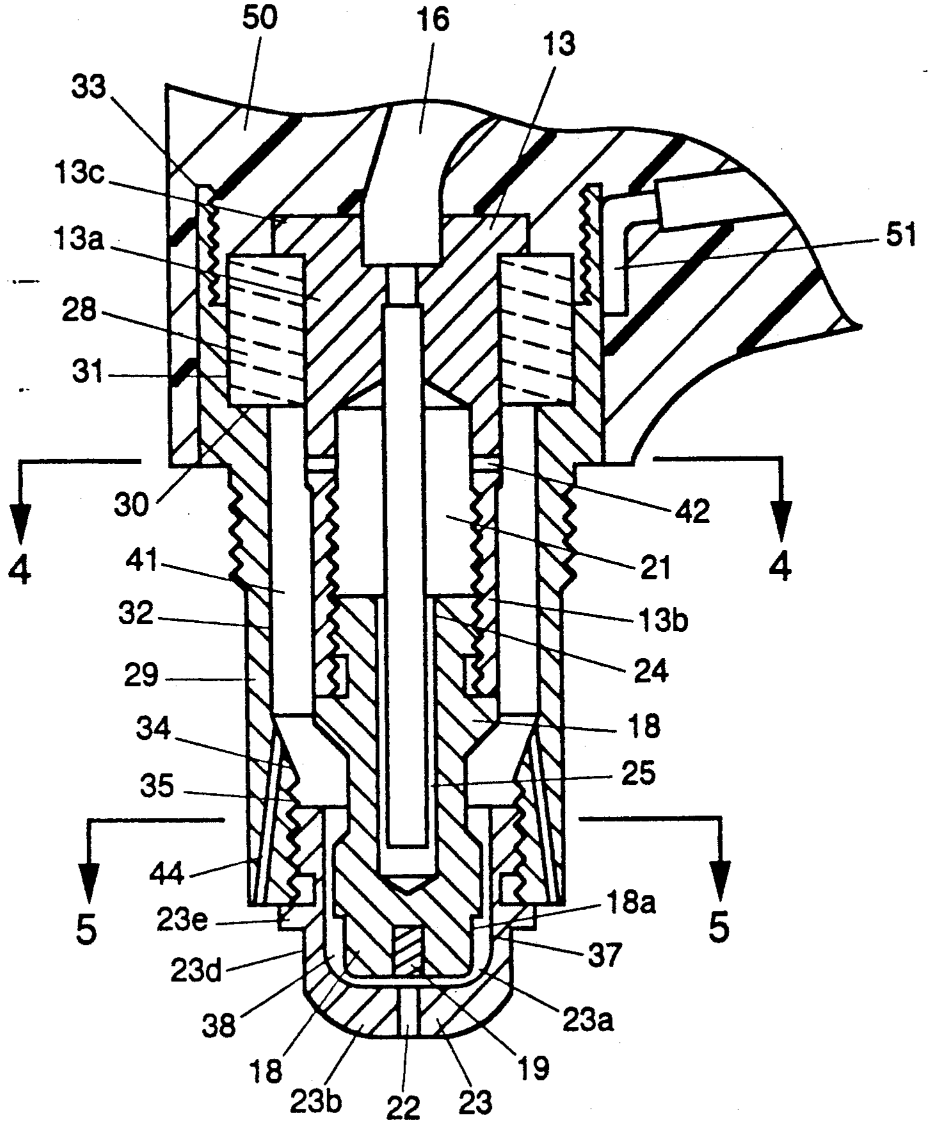
FIG. 3 is an enlarged cross sectional view of a portion of the torch head of FIG. 2.

The torch head is axially elongated and includes an axially elongated electrode adaptor 13 that has an entry end portion 13*a* and an axially opposite lower end portion 13*b* (also see FIG. 3). The adaptor has a central bore 15 extending therethrough, the adaptor upstream end portion having the upper part of the bore and the downstream end of the air conduit 16 extended thereinto and the upstream end portion of the air (gas) tube 17 mounted therein in fluid communication with the conduit. Both o the air tube and the air (gas) conduit are soldered to the adaptor and are made of an electrically conductive metal.

The lower end portion 15*a* of the bore 15 is of a diameter many times greater than the air tube, the lower part of bore portion 15*a* being threaded for removably mounting the end portion of the electrode 18 for closing the lower end portion of bore 15 and together with the adaptor form an annular first chamber 21 surrounding the adjacent part of the air tube. The electrode is provided with a shoulder to limit the upward threading movement of the electrode in the bore 15 and to precisely align it with the torch head central axis C—C (aligned with the central axis of elongation of bore 15 with the axis C—C). This alignment along with being aligned with the nozzle orifice 22 and the electrode insert 19 which will described below has a considerable bearing on the useful life to the torch. The lower end portion of the electrode mounts the insert 19 that facilitates the striking of an arc, the insert being in axial alignment with the orifice 22 of the nozzle 23 and the air tube 17.

The electrode has a radially centered, axial bore 24 concentric to the air tube, and of a larger diameter than the outer diameter of the air tube to provide an annular clearance space that at its upper end opens to the lower end of the adaptor chamber 21. The lower terminal end of the electrode bore is closed and axially spaced above the insert. The diameter of the adaptor bore axially adjacent to the upper end of the electrode is much greater than the diameter of bore 24, for example at least twice the diameter The electrode bore is of an axial length that is, for example about ¾'s of the length of the electrode and terminates axially spaced from the insert and terminates below the air tube to permit air flow from the tube and up through the space 25 to the adaptor chamber.

The upper end portion 13*a* of the adaptor extends through the insulator ring 28 and has an upper radially enlarged flange 13*c* seated on the ring. The flange 13*c* is of a larger outer diameter than the diameter of the bore portion 32 of the shell 29 and intermediate the diameters of the inner and outer diameters of the ring while the inner diameter of the ring is less than the diameter of the bore portion 32. The lower annular edge of the ring has its radial outer annular part seated on the upwardly facing shoulder 30 formed at the intersection of the bore portion 30 and bore portion 32 of the bore that extends axially through the torch shell 29 of the torch head. The shell has internal threads defining the upper end portion 33 of the shell bore, the minimum diameter of the threads being greater than the outer diameter of the ring, radially spaced from the ring and extend upwardly from the axial intermediate portion of the ring, is of a larger diameter than bore portion 31 and intersects with bore portion 31.

The shell has a frustoconical wall portion defining a bore portion 34 that at its major base opens to bore portion 32 and at its minor base opens to the threaded bore portion 35 that opens through the lower annular surface of the shell. The lower threaded portion 35 removably mounts the nozzle 23. The nozzle has an annular flange 23*e* abutting against the shell to limit the movement of the nozzle into the shell whereby the lower, generally horizontal nozzle wall 23*b* that in part defines the generally cup-shaped nozzle well 37 is retained axially spaced from the lower end of the electrode to permit air flow from annular clearance 38 between the lower part of the electrode and the inner surface of the annular wall 23*a* of the nozzle to the nozzle orifice 22 in the nozzle wall 23*b*. The axial spacing of the electrode from the nozzle bottom wall 23*b* as shown in FIG. 3 is exaggerated to more clearly show the gap. The nozzle annular wall extends to a higher elevation than the lower terminal end of the air tube.

Figure 13:
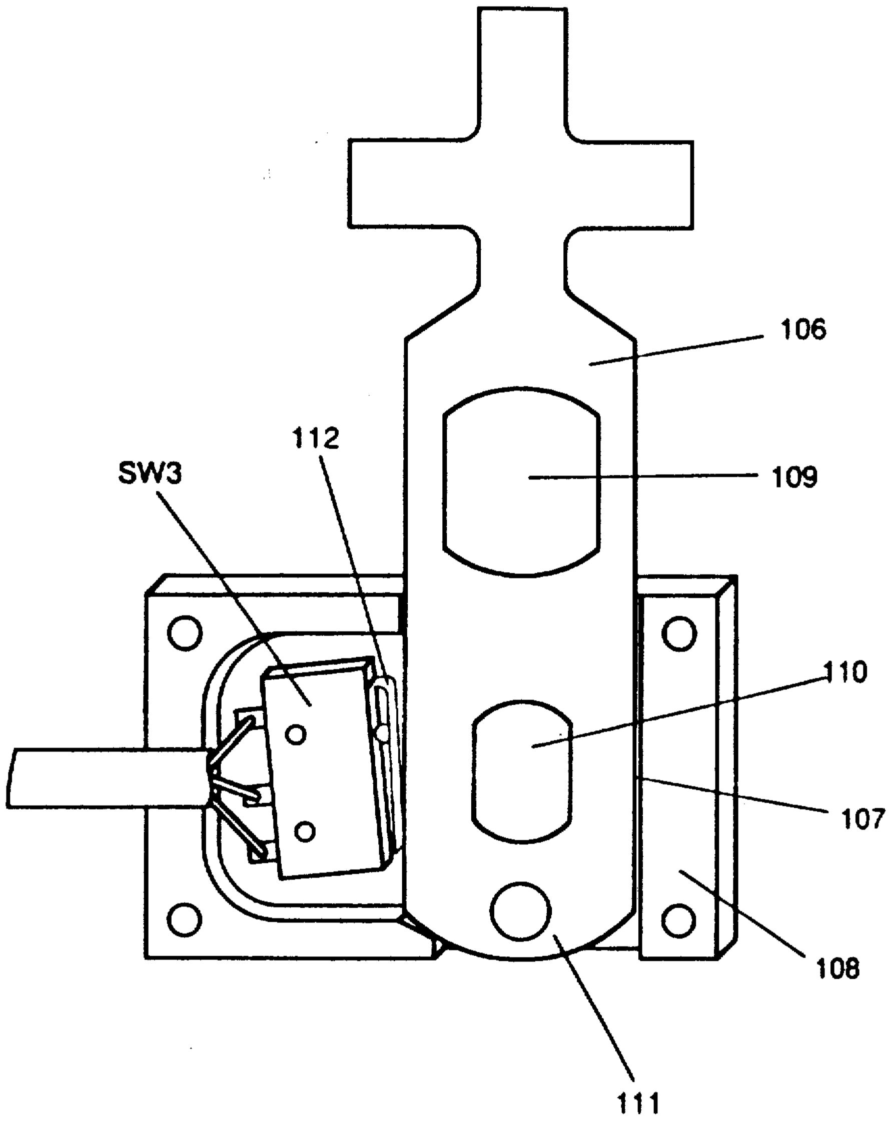
FIG. 13 is a perspective view of the wrench house with the cover removed and the wrench housed in the housing to retain the wrench interlock switch in a closed position.

The nozzle annular wall has diametrically opposite parallel lands 23*d* and annular wall portions with generally circular outer surfaces extend between the lands. The lands extend axially below the lower annular edge of the shell (axially more remote from the insulating ring than the lower terminal annular edge of the shell) to facilitate using, preferably a wrench 106 (see FIG. 13), or otherwise unthreading the nozzle from the shell. Further the electrode has diametrically opposite parallel lands 18*a* extending axially below the lower annular edge of the shell to facilitate unthreading the electrode from the electrode adaptor after the nozzle has been unthreaded from the shell. Thus the electrode can be easily removed for replacement.

Figure 4:
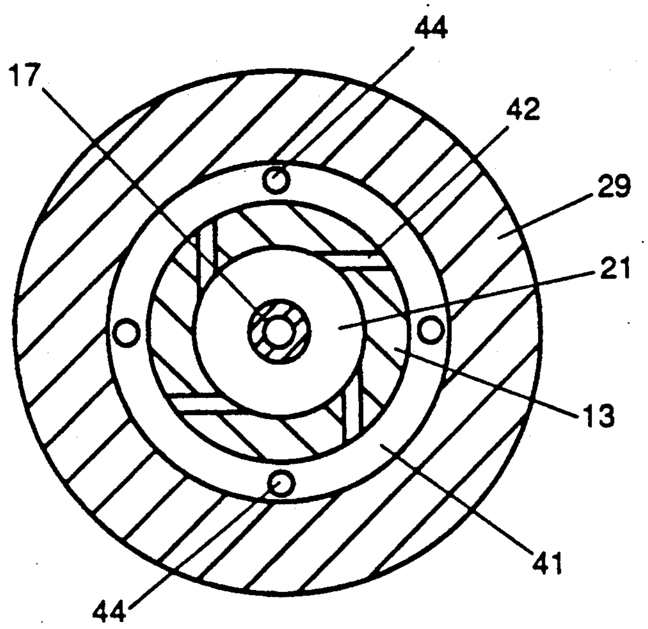
FIG. 4 is a transverse cross sectional view taken along the line and in the direction of the arrows of FIG. 3.
Figure 5:
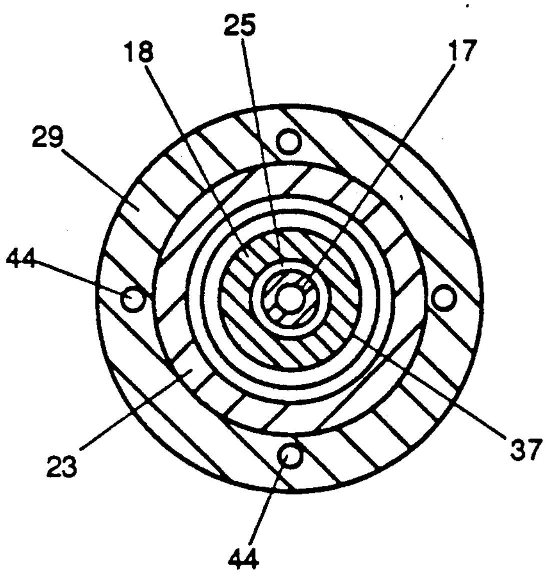
FIG. 5 is a lateral cross sectional view taken along the line and in the direction of the arrows of FIG. 3.

An expansion second chamber 41 is defined by the lower edge of the insulation ring, the shell walls that define bore portions 32, 34 and the part of portion 35 that extends above the nozzle and the upper edge of the nozzle. The lower annular end of the chamber 41 opens to well 37 while the upper end portion of the chamber 41 opens through a plurality of passages 42 in the adaptor to the first expansion chamber 21. The passages open to the first chamber more closely adjacent to the upper end of the chamber 21 than the upper end of the electrode and to the chamber 41 axially much more closely adjacent to the ring than the upper end of the electrode. Even the passages 42 throughout their radial length are shown in FIGS. 2 and 3 in a common plane, it is to be understood the passages extend horizontally at an angle, for example about 90° degrees to that shown in FIGS. 2 and 3, for example as shown in FIG. 4, to impart a clockwise spiral of air in chamber 41 as the torch head is shown in FIG. 3. The combination of bore portions 32, 34 extend to a lower elevation than the adaptor and to a much higher elevation than the upper end of the nozzle.

The lower end portion of the shell has a plurality of angularly spaced, downwardly and radially outwardly inclined passages 44, advantageously 4, that at their upper ends open through wall portion 34 to chamber 41 and at their lower ends through the lower edge of the shell radially outwardly of the nozzle flange that abuts against the shell. The major portion of the air flowing from chamber 21 to the chamber 41 flows through passages 44 to cool the shell and the metal surface being cut and a small part through the nozzle orifice. The air flow exits from the air tube and thence through the passages 42 in a spiral fashion and cools the electrode Further the air exiting from the orifice 22 spirals in the same direction as the spiral of air in the second chamber.

Figure 14:
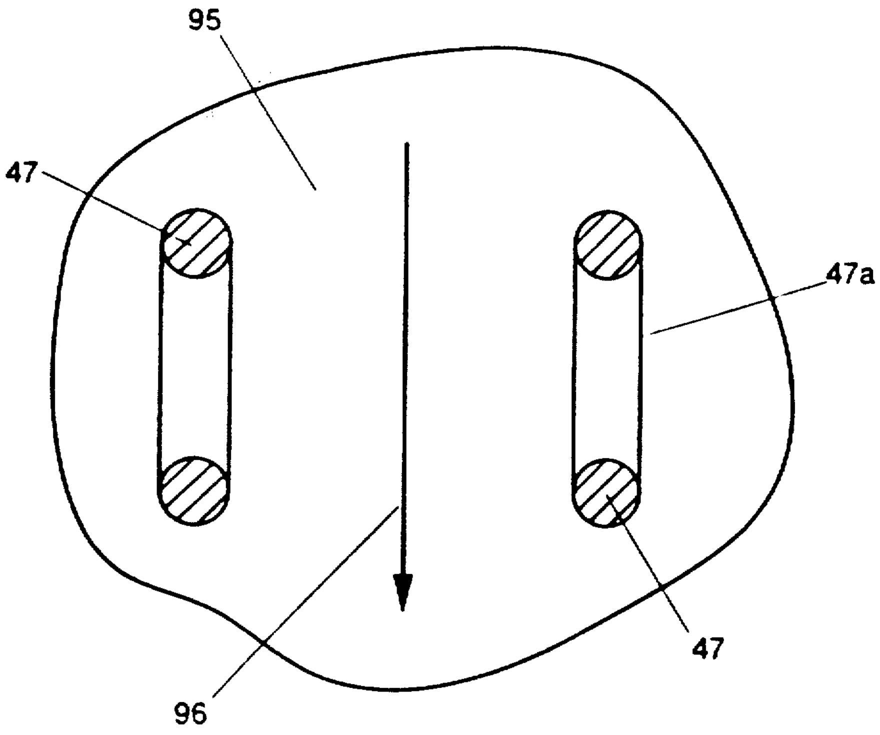
FIG. 14 is a lateral cross section view of the wire standoff showing the lower end portions of the standoff legs relative the direction of the cut being made in the metal.

The upper end portion of the bore 45 of the frustoconical holder 46 has internal threads for being removably mounted by the shell, the holder being made of an electrical insulating material, for example a high temperature Teflon. The holder extends downwardly to the bottom annular edge of the shell. A wire standoff 47 has diametric opposite, generally U-shape, diametric opposite legs 47*a* that at there upper ends are joined to arcuate portions 47*b* seated in an annular groove 48, one of the arcuate sections being axially split (not shown . The annular groove is formed in the radial outer, upper end portion of the holder while the legs including the webs 47*c* joined to the respective pair of legs, extend below the nozzle to space the lower surface of the nozzle, for example about a tenth of an inch, from the cutting surface to reduce drag and increase nozzle life. The lower end portions (webs 47*c*) of the legs are rounded while the arcuate sections 47*b* permit the standoff to be rotated about the torch head central axis C—C for better visibility and better access to the cutting area. Preferably, during the cutting operation, the standoff is rotated to a position the webs, as viewed in FIG. 14, extend generally parallel to the direction of cut 96 and equally spaced on either side of the cut if the direction is linearily and if the cut is arcuately curved, then generally parallel to a tangent to the curve to the extent practical.

The holder 46 has an outer peripheral surface that is generally frustoconical with a lower minor base edge being less than the upper major base to also provide for better visibility of the cutting surface. The holder insulates the standoff from the shell and extends downwardly to an elevation about the same as the top of the insert.

The generally cylindrical top member 50 of the torch head has the downstream end portion of the air conduit 16 extended therein to be in fluid communication with the top end of the air tube and also has the downstream end of the high voltage electrical conductor 51 extended therein. The electrical conductor is electrically connected to the upper end of the shell for carrying pilot arc current to the shell and therethrough to the nozzle. The top member is in contact with the top of the adaptor and ring, fills the space between shell upper threads 33 and the flange 13 and the upper part of the ring and the upper outer annular surface of the shell to have a lower annular edge that is abuttable against the top edge of the holder. Advantageously the cylindrical portion is of a plastic material that is molded after assembling the ring, shell and adaptor to in conjunction with the ring, hold the ring in abutting relationship to the shoulder 30 and thereby the adaptor in concentric relationship to the shell and nozzle such as shown in the drawings, i.e. with the central axis C—C of the torch head also being the central axis of each of the adaptor, electrode, shell, ring and the nozzle. That is, the top member encapsulates the above mentioned and provides rigidity and electrical insulation for said parts. In addition the insulating ring is glued to the shell and the electrode adaptor for added rigidity. In place of internal threads other radially inwardly extending protrusions may be used, provided such do not interfere with inserting the ring to abut against the shell shoulder.

Referring to FIGS. 1 2, 6 and 7, the body B advantageously is made of the same material as the top cylindrical member 50 of the torch head and has its downstream end integrally joined to the top member 50 to extend generally laterally thereof at an included obtuse angle with the lower part of the torch head, for example angle of about 97° torch (head angle of about 83°). The angle of extension of the air tube laterally elongated portion 16*a* relative to the central axis is generally 97°. Thus when the cutting surface extends horizontally, the head central axis is perpendicular to the cutting surface, the top surface of the torch body at its downstream end portion is at a lower elevation than the upstream end portion of the torch body. The air conduit 16 and the electric line 51 extend though the body at about the same angle as said obtuse angle. Thus the air conduit and line 51 in the torch head are bent through about the same obtuse angle as shown in FIG. 2 and the downstream end portion of air conduit extending axially into the adaptor and being centered relative to the central axis C—C. The torch body encapsulates nearly the entire lateral length of both of the conduit and conductor 51 from the torch head to adjacent the upstream end portion thereof. The downstream end of the line 51 is soldered to the upper end of the shell 29.

Figure 6:
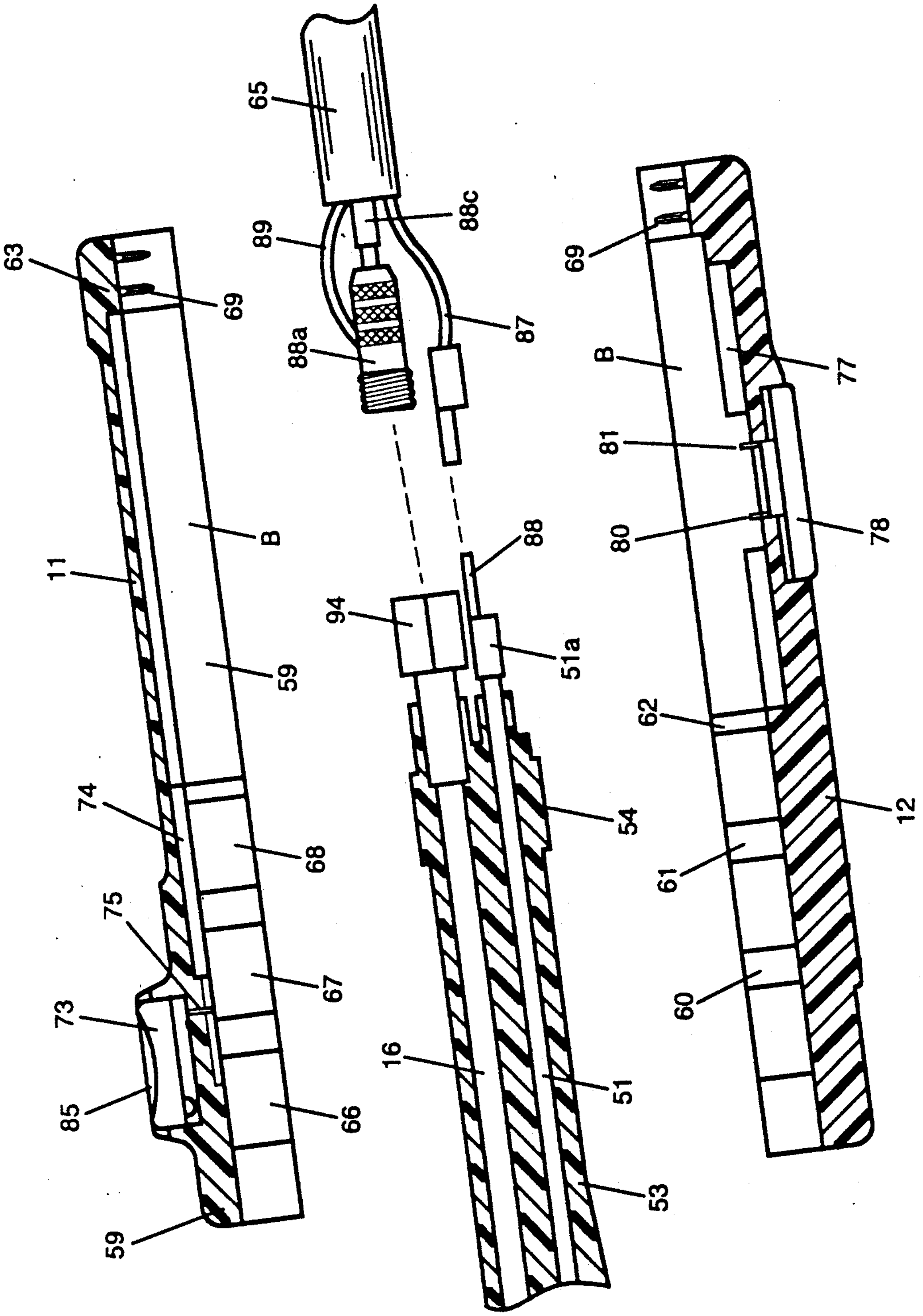
FIG. 6 is a fragmentary cross sectional view of part of the torch body and the handle in transverse (radial) separated relationship to show the relative positions of the switch buttons and the laterally adjustable feature of the handle sections relative the torch body, said view being generally taken along the line and in the direction of the arrows 6—6 of FIG. 8 other than for the separated condition of parts.
Figure 7:
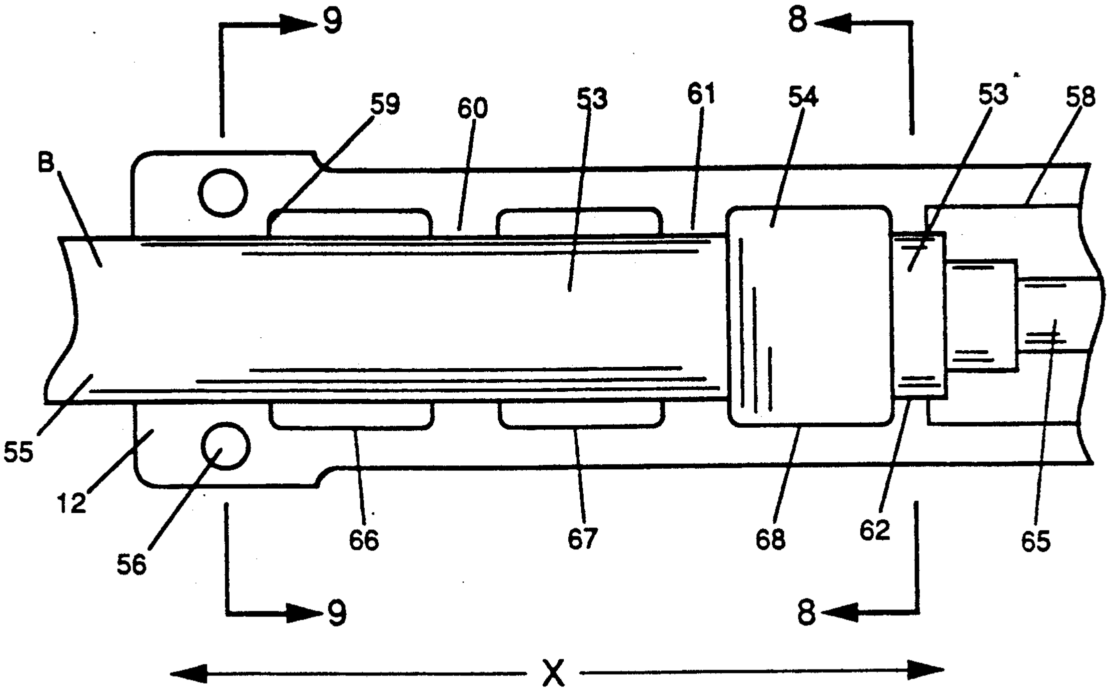
FIG. 7 is a view that is taken at right angles to that of FIG. 6, said view being generally taken along the line and generally in the direction of the arrows 7—7 of FIG. 8.
Figure 8:
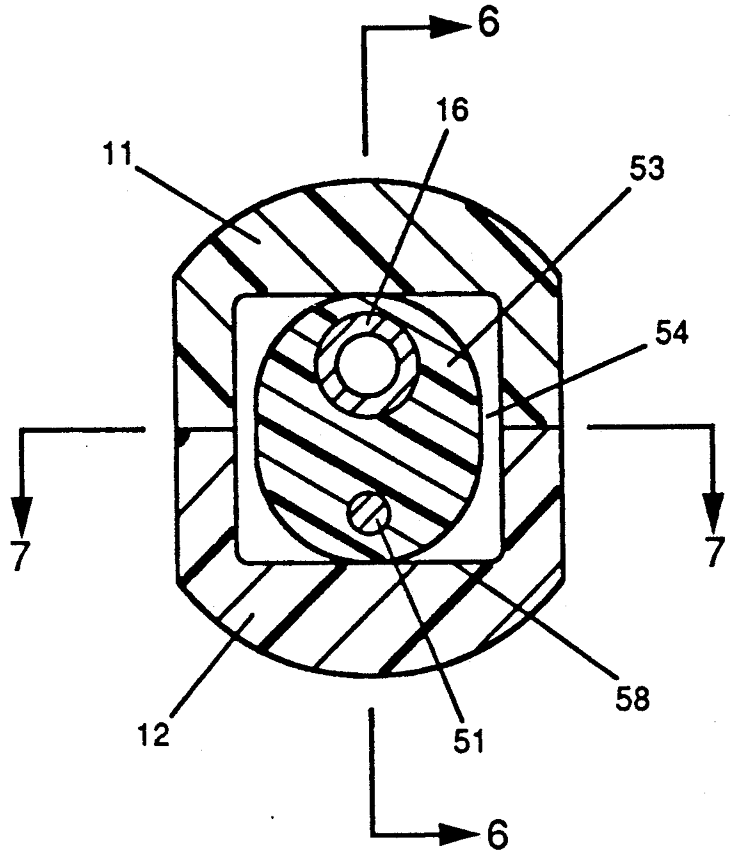
FIG. 8 is a transverse cross section view taken along the line and in the direction of the arrows 8—8 of FIG. 7.
Figure 9:
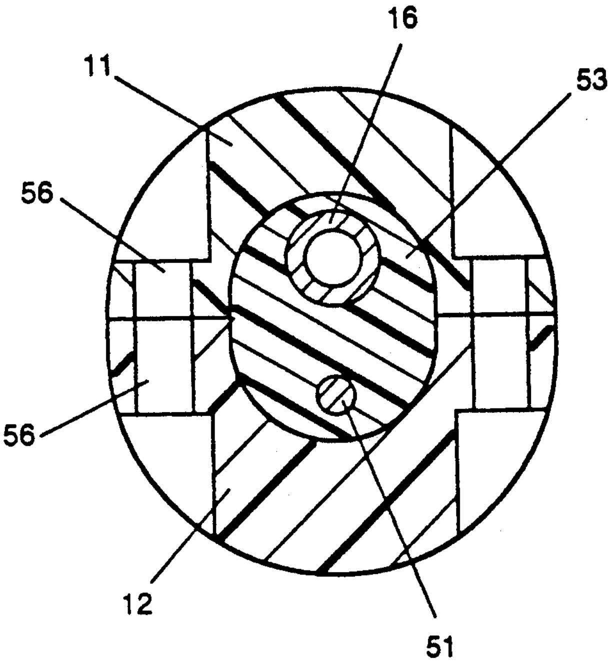
FIG. 9 is a transverse cross section view taken along the line and in the direction of the arrows 8—8 of FIG. 7.
Figure 10:
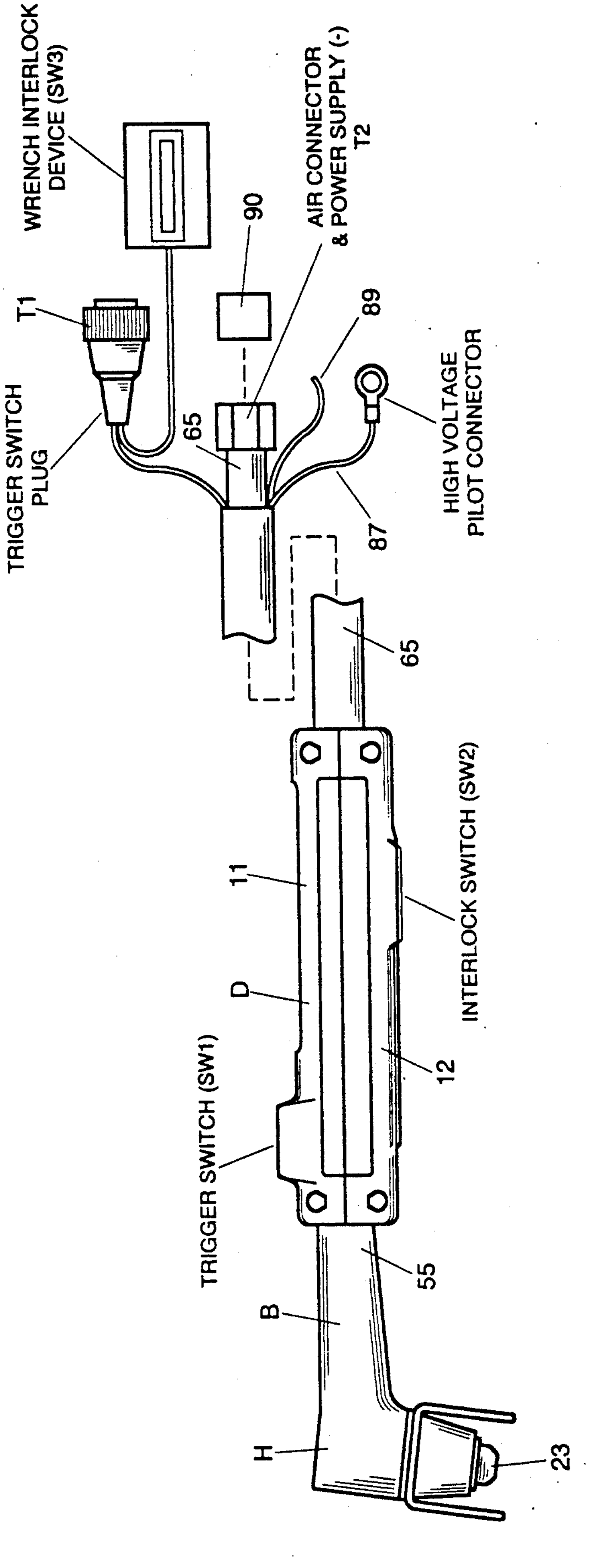
FIG. 10 is generally a diagrammatic view of the torch and cable for electrically and pneumatically connecting the torch to conventional air and electrical supplies for a plasma torch.
Figure 11:
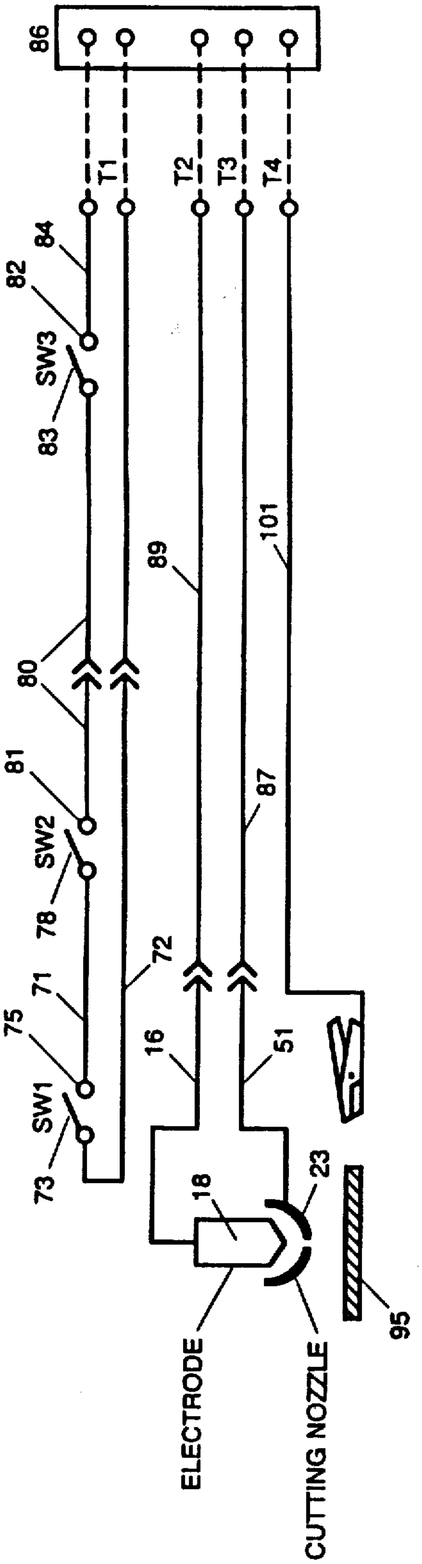
FIG. 11 is a torch and electrical conductor schematic diagram.
Figure 12:
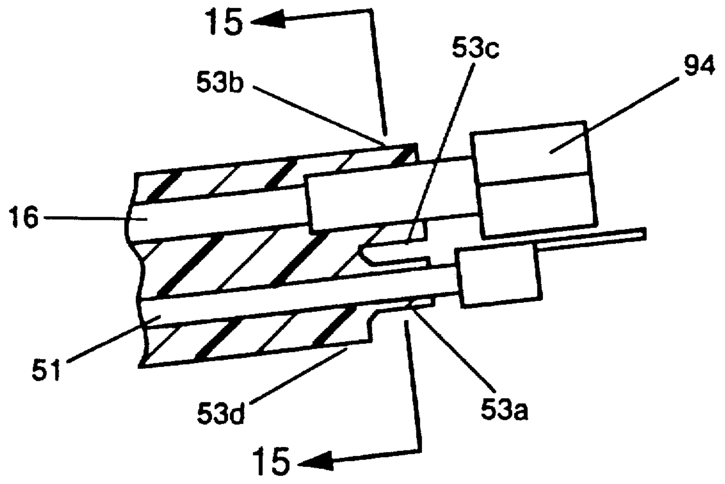
FIG. 12 is an enlarged lateral cross section view of the upstream end portion of the body, including the annular body flanges for preventing sparking between the air tube and the electric conductor that extend through the body.
Figure 15:
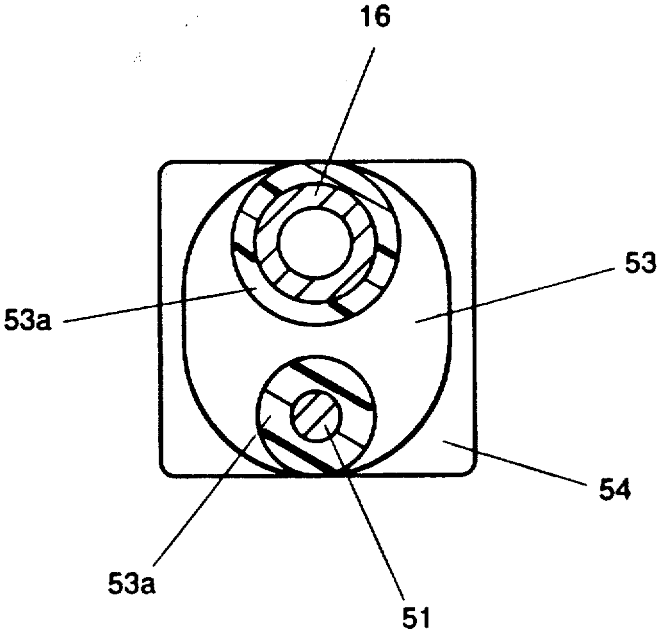
FIG. 15 is a fragmentary transverse cross section view showing the upstream terminal end of the body that is shown in FIG. 12.

The laterally elongated body upstream end portion 53 that extends about the distance of dimension line X (FIG. 7) is generally of an elipsoid shape in transverse cross section except for the rectangular block portion 54 which is a short distance downstream of the upstream terminal end surface part 53*d* (see FIG. 6) of the body and is of the same height as that of portion 53 and of a great width than portion 53 see FIGS. 8 and 9). In FIG. 6 and 15 the right end of dimension of X is surface 53*d*. The torch body upstream end portion is joined to the body intermediate portion 55 which may be of progressively larger transverse cross sectional areas in a direction toward the body downstream portion 52.

The body has a first annular wall part lateral flange) 53*a* surrounding the air conduit 16 that extends to the right (upstream) of end surface part 53*d* and an annular wall part lateral flange) 53*b* surrounding the electrical conductor 51 and likewise extending upstream of end surface part 53*d*. Parts 53*a* and 53*b* are made of the same material as the rest of the body, molded as one integral unit therewith, radially spaced from one another, and of smaller outer diameters than the minimum transverse dimension of body portion 53. The wall parts terminate downstream of the upstream terminal end of the air conduit 16 and the electrical connector 51.

The provision of the wall parts 53*a* and 53*b* provide a generally U-shape path 53*c* along their radial outer surfaces that extends from the upstream terminal end of wall part 53*a*, to and along the upstream surface of the body extending transverse between parts 53*a*, 53*b* and thence along wall part 53*b* to the upstream terminal end of part 53*b*. As a result the likelihood of an electrical spark between the non-insulated upstream end portions of the air conduit and the electrical connector 51 is substantially decreased from that which would be present if the upstream end of the body terminated at 53*d*. The length of path 53*c* should be more than ½".

The handle sections 11, 12 at their laterally opposite ends have apertures 56 extended therethrough for screws 57 extended thereinto to secure the handle sections to one another see FIGS. 6–9). When secured together, the handle sections have internal walls defining an elongated channel 58 extending laterally through the handle and that throughout the major part of the lateral length of the handle is generally rectangular. The channel is in part defined by internal handle protrusions 59 through 63 that are laterally spaced from one another. The protrusions 59, 63 are at the opposite end portions of the handle sections to define channel portions to form a close fit with the radial adjacent part of torch body and the cable 65 respectively. A plurality of arcuate and laterally spaced ribs 69 are provided on the protrusion parts of the protrusion 63 on each of the handle sections. The ribs provide a better gripping action of the cable to help prevent the cable being twisted or pulled outwardly of the handle sections during normal use. Thus when the torch handle is being pulled the strain is transferred directly to the cable insulating material (not the electrical conductors and air tube contained in the cable) rather than from the handle through the electrical and air connections and thence to the cable insulating material. This strain relief feature decreases the wear and subsequent electrical shorts and other malfunctions adjacent the electrical connections of electrical components in the cable to the ones in the handle from that which would otherwise occur in the event the ribs were not provided.

The cable contains a plastic air conduit 88*c* that is adapted to be connected through its metal fitting 88*a* to the fitting 94 of the first air conduit 16 within the channel 59 while the upstream end portion of the conduit 88*c* is fluidly connected to the air source 90. As will be set forth fitting 88*a* is electrically connected through a terminal T2 to a high voltage source in the controller 86. Thus fitting 94 is both an air and an electrical connection. The upstream end portion 51*a* of the conductor 51 is adapted for connection to the high A.C. voltage pilot wire and connectors 87, 88. Thus high A.C. voltage is provided through the air conduit 16 to the air tube 17 and through conductor 51 to the nozzle as will be set forth below, the connector wire 87 extending through the cable.

The protrusions 59, 60 in part define a generally rectangular channel cavity 66 of a shape to form a close fit with the outer peripheral portion of the block as do the protrusions 60, 62 and 63 in part define corresponding channel cavities 67 and 68 respectively that are laterally spaced from one another and of the same size and shape as cavity 66. Wall portions defining the cavities serve to fixedly retaining the body in selected lateral positions relative to the handle with the body being assembled such that the drill head extends downwardly relative to the body. The Cavities permit the operator to mount the torch head in three selected laterally adjusted positions for allowing better maneuverability and access to the cutting area. Even though three cavities have been referred to, the handle may be provided with two or more cavities and the upstream body end portion 53 of the appropriate axial length.

For controlling the flow of electric current to the torch head, the electric circuitry (see FIGS. 6, 10, 11 and 13) includes a trigger switch member SW1 having a push button 73 resiliently retained in an open condition and when pushed inwardly, electrically connects the terminals 75 with a line 71 being connected to one terminal and a second line 72 being electrically connected to the other terminal The push button is mounted on the top part of the upper handle section 11 adjacent to the downstream terminal end of the upper handle section. The lines 71, 72 at least in part extend in the laterally elongated recess 74 which opens to the top of the channel 59.

The electrical circuitry also includes an interlock switch member (SW2) having a push button 78 resiliently retained in an open condition and when pushed inwardly, electrically connects the terminals 81 with a line 80 being connected to one terminal 81 and line 71 being electrically connected to the other terminal 81. The push button 78 is mounted on the bottom part of the lower handle section 12 laterally much more closely adjacent to the upstream terminal end of the lower handle section than the trigger switch SW1. The lines 81, 71 at least in part extend in the laterally elongated recess 77 which opens to the bottom of the channel 58. The terminals 82 of the normally open wrench interlock lever switch SW3 has a switch member 83 that is resiliently retained in its off position, but is moved to its on position through the wrench, generally designated 106, being extended into the slot 107 of the housing 108. The wrench has a nozzle opening 109 of a size and shape to form a relative close fit with the nozzle portion having the lands for wall portions defining the opening 109 abut against the lands when the nozzle is extended therethrough; and an electrode opening 110 of a size and shape to form a relatively close fit with the electrode portion having the lands 18*a* whereby wrench wall portions defining opening 109 abut against lands 18*a* when the corresponding portion of the electrode is extended through the opening 109. The wrench also has a lower end portion 111 that as the wrench is extended into the housing slot abuts against the lever 112 of tho switch SW3 and move the lever that in turn moves the switch member 83 to its closed position and when the wrench has been moved to its storage position of FIG. 13 abut against the slotted housing wall portion to retain the lever in its switch closed position so that switch member 83 remains in its closed position. This provides a safety feature in that when the wrench is removed for removing one or both of the nozzle and electrode from the rest of the torch head, the switch member 83 is resiliently moved to its open position. The housing 108 may be attached to the cable and removably attached to the controller.

The terminals 82 are respectively connected to the respective one of the lines 80, 84, line 84 being connected through terminal T1 to a conventional plasma torch power supply and controller 86 and line 80 being connected to terminal 81. Thus the lines 71 72, 80 and 84 connect the trigger and interlock switches SW1 and SW2 in series such the interlock switch SW3 has to be in its closed condition and both push buttons 78, 83 have to be manually pushed inwardly to energize the torch. The push buttons are located such that when the torch is being held by on hand, the trigger switch push button has to be pushed by the thumb of said one hand and the interlock switch push button 78 has to be pushed by the two little fingers of the same hand to start the cutting operation, apply the appropriate voltage and current terminals T1 through T4, i.e. completed a circuit as will be more apparent hereinafter. Lines 72, 80 which extend into the handle chamber are joined to corresponding line parts in the cable.

Body portions 85 extend along transverse opposite sides of push button 73 and further radially outwardly of the laterally adjacent parts of the body to protect against damage if the torch is accidentally dropped. Further in part due to the provision of portions 85, the operator has to positively push button 73 to start the cutting operation. The handle interlock switch button 78 has to be pushed to a closed condition to energized the torch and functions against accidental start of the pilot arc if only the trigger button is unknowingly pushed.

A plastic air conduit 88*c* at its downstream end portion has a fitting 88*a* adapted for connection to fitting 94 and is electrically connected to electric conductor 89. Conductor 89 is extended through the cable for being connected through terminal T2 to a negative terminal of the controller 86 to provide D.C. current at the electrode while the positive terminal of the controller is connected to the terminal T4 that in turn is connected through conductor 101 to the metal 95 that is to be cut. Further the line 51 has a solder junction 51*a* in the handle chamber that is connected to a electrical connector 88 in the handle. Connector 88 is connected to a conductor 87 which extends through the cable and to a terminal T3 that is connected to a source of high A.C. voltage of the controller 86 while another terminal of said source is also electrically connected to terminal T2.

The plasma torch is used in conjunction with plasma power supplies for metal cutting applications. The torch can deliver kinetic and thermal energy to a piece of metal through the plasma gas. The thermal energy is provided by superheating of atmospheric air though the plasma process with the pressure of air being applied to the conduit 16 being, for example generally about 70 psi generates the kinetic energy through the high speed stream of plasma gas.

With switch member 83 closed and both of the push button switches members 78, 73 closed, a circuit (not shown) in the controller is closed so that a high A.C. voltage is applied through line 51 and then to the cutting nozzle through the head shell for a short period of time during the initial starting of the cutting operation and to deliver DC current through the adaptor to the electrode in a conventional manner. The high A.C. voltage (signal) ionizes the air in the small gap between the electrode and the nozzle and converts the air to a weak plasma arc while the DC current delivered from the power supply through the electrode to the nozzle to generate a pilot arc between the electrode and nozzle even when is remotely spaced from the metal to be cut. If the cutting nozzle is now brought within, for example about ½" of the metal connected to the positive terminal of the power supply, an intense high current plasma arc for example up to about 85 Amps.) is generated. This arc is fueled by the constant supply of air and electricity from the power source. Moving the torch along the length of the metal piece at this time generates a cut in the metal for as long as the arc between the metal and torch is maintained. The standoff keeps the distance between the nozzle and the metal surface being cut to an optimum height to provide a maximum cutting capability while allowing the operator to move the torch over the metal surface with ease and prevents overheating of the cutting nozzle resulting in longer life. The standoff also insulates the torch head shell from the metal surface for proper start of the pilot ignition arc. The standoff is rotatable in groove 48 so that the legs can be repositioned as desired to be perpendicularly opposite the cut in the direction of cut as shown in the drawings

What is claimed is:

1. A plasma torch comprising an axially elongated torch head that has a central axis and includes an axially elongated electrode adaptor that has an entry end portion and an axially opposite end portion, the adaptor having first wall means defining a bore extending therethrough, including at least part of a first chamber portion, an axially elongated air tube, an axially elongated electrode having a first end portion and a second end portion that is mounted by the adaptor opposite end portion and in conjunction with the adaptor defines at least part of a first chamber having the first chamber portion, the electrode having an elongated bore that has one end opening to the first chamber and an opposite terminal end axially remote from the adaptor, the elongated air tube having an entry end mounted by the adaptor and an axially opposite terminal end located in the electrode bore axially more closely adjacent to the electrode bore terminal end than the opening of the electrode to the first chamber, the air tube and electrode bore being of relative diameters to form an annular clearance space extending from the tube terminal end to the first chamber, an axially elongated torch head shell that includes an entry end portion, a discharge end portion extending in the ambient atmosphere and having a discharge end and second wall means in radial spaced relationship to the adaptor and at least part of the electrode to define a bore extending axially therethrough, a nozzle mounted by the shell discharge end portion for nearly closing the shell bore discharge end and having a discharge outlet for discharging a plasma generally axially relative to the torch head, the nozzle being radially and axially spaced from the electrode, insulation means abutting against the adaptor entry end portion and the shell entry end portion for retaining the adaptor in radial spaced relationship to the shell, the insulation means, shell, nozzle and at least part of at least one of the adaptor and electrode forming an axially elongated, annular second chamber that has a lower end portion opening to the nozzle and an upper end portion axially remote from the nozzle, the second chamber upper end portion having an upper end, the adaptor having at least one first passage that opens to the first chamber axially remote from the electrode and to the second chamber more remote from the nozzle than the second chamber upper end for creating a spiral fluid flow in the second chamber, the second chamber along the axial length thereof from the first passage to the nozzle being annular, the shell having at least one second passage that angularly extends downwardly from the second chamber lower end portion for discharging gas through the shell discharge end to the ambient atmosphere radially outwardly of the nozzle outlet to spiral in the same direction that the fluid flows in the second chamber, the shell second passage having an outlet that is entirely radially outwardly spaced from the nozzle outlet, the opening of the electrode bore to the first chamber being axially intermediate the air tube terminal end and said first passage and the minimum axial distance of the electrode from the first passage being less than the minimum axial distance of the nozzle from the first passage.

2. The plasma torch of claim 1 further characterized in that the nozzle is threadedly mounted by the shell and has flat lands extending axially more remote from adaptor entry end portion than the shell to facilitate removing the nozzle from the shell and that the electrode is threadedly connected to the adaptor and has flat lands extending axially more remote from the adaptor entry portion than the shell to facilitate removing the electrode from the adaptor after the nozzle has been removed, the second passage extending axially through the shell in radial spaced relationship to the nozzle.

3. The plasma torch of claim 1 further characterized in that the insulating means comprises an insulating ring, the second wall means has a first wall portion that in part defines the second chamber and a second wall portion for extending axially along the insulating ring, axially more remote from the nozzle than the first wall portion, of a larger inner diameter than the inner diameter of the first wall portion and is joined to the first wall portion to in conjunction therewith form a shoulder facing the insulating ring to limit the movement of the insulating ring toward the nozzle and that the torch head has a generally cylindrically insulating head portion permanently secured to the shell to retain the insulating ring and adaptor in fixed relationship to the shell 4. The plasma torch according to claim 1 characterized in that the electrode bore is of a length that is more than half of the axial length of the electrode, that the axial distance between the opening of the first passage to the first chamber and the electrode terminal end is at least 60% of the axial length of the air tube.

5. The plasma torch according to claim 4 further characterized in that the nozzle has an end wall axially spaced from the electrode having the plasma outlet therein for discharging the plasma and located axially more remote from the insulating means than the shell, is axially elongated and is in annular radially spaced relationship to the electrode to form an annular clearance space therewith that opens to the second chamber for having the flow of fluid in the second chamber to continue to spiral as the fluid flows to the nozzle outlet, the second passage diverging axially away from the central axis in an axial direction away from the second chamber.

6. The plasma torch of claim 5 further characterized in that there is provided a torch body having a downstream end portion joined to the torch head, that the torch head has a central axis of elongation and extends at an obtuse angle relative to the body and a top member mounting the adaptor and shell, that the air tube, adaptor, shell and electrode are each made of an electrically conductive material, that there is provided an air conduit having an electrically conductive tubular portion made of an electrically conductive material that has a downstream end portion extending axially within the top member in axial alignment with the central axis and in electrically conductive relationship to the electrode adaptor and opening through the adaptor to the air tube and an upstream end portion that is bent relative to the conduit downstream end portion through an angle about the same as the obtuse angle and joined to the downstream portion, and that there is provided a high A.C. electrical conductor having one end electrically connected to the shell in transverse spaced relationship to the conduit upstream end portion, the torch head top member and body being made of electrical insulating material and encasing at least the downstream end portion of the conduit, the upstream end portion of the air conduit adjacent to the downstream end portion of the conduit, including its juncture to the conduit downstream end portion, and at least the connection of the electrical conductor to the shell, including filling the space between conductor adjacent to shell and the downstream end portion of the air conduit, the shell and nozzle being made of an electrical conductive material, and the air conduit and the high A.C. electrical conductor extending through the torch body.

7. The plasma torch according to claim 1 further characterized in that the first chamber has a first terminal end adjacent to the adaptor entry end portion and axially remote from the electrode bore terminal end, and that the second chamber opens directly to the annular clearance between the nozzle and electrode and in combination with the last mentioned clearance space is of an axial dimension greater than the axial distance from the electrode bore terminal end to the first chamber terminal end.

8. The plasma torch according to claim 6 wherein the nozzle has an annular peripheral wall that in conjunction with the electrode opens to the second chamber and to the end wall and the shell at least one second passage that has one end opening to the second chamber axially adjacent to the nozzle peripheral wall, extends at an angle to the central axis to have a discharge end opening to the ambient atmosphere radially more remote from the central axis than the second passage one end and axially more remote from the insulating means than the second passage one end.

9. The plasma torch of claim 8 further characterized in that the axial spacing of the opening of the first passage to the first chamber from the nozzle wall is n early the same as the axial length of the electrode bore in combination with the axial length of the first chamber.

10. The plasma torch according to claim 1 wherein it includes a laterally elongated torch body that includes a downstream end portion joined to the torch head and a laterally opposite upstream end portion, and a laterally elongated handle having a downstream end portion removably retained on the body upstream end portion and a laterally opposite upstream end portion, the handle having walls means defining a chamber extending axially therethrough and the body extended thereinto, the wall means including a non-circular first wall for forming a clamping fit with the laterally adjacent part of the upstream end portion of the handle to prevent rotation of the body relative to the handle.

11. The plasma torch of claim 10 further characterized in that the handle includes a plurality of laterally elongated sections transversely separable from one another to permit transverse removal of the body from the handle sections and securable to one another to retain the handle sections in fixed relationship to each other and means for removably securing the handle sections to one another, the body upstream end portion having an elongated first part that is of substantially the same peripheral transverse size and shape throughout its length and a second part of at least one of a substantially different peripheral size and shape than that of the first part, and that the handle wall means includes a plurality of laterally spaced first wall parts to form a close fit with the body second part to retain the body in selected laterally adjusted positions relative to the handle before the handle sections are secured together.

12. The plasma torch of claim 11 further characterized in that the wall sections consist of two laterally elongated half sections, each half section defining about half of the handle chamber, that the body second part in transverse cross section is generally block shaped, that the body first part in transverse cross section is arcuately curved, that each of the handle first wall parts is generally block shaped in transverse cross section and of a size to form a closed fit with the body second part and that the handle wall means includes a plurality of laterally spaced second wall parts, one of handle second wall part being laterally between each pair of laterally adjacent handle first wall parts, each handle second wall part being of a size and shape to form a close fit with the body first part in partial surrounding relationship thereto.

13. The plasma torch of claim 12 further characterized in that the body first part is generally ellipsoidal in transverse cross sectional out throughout its length.

14. The plasma torch of claim 11 further characterized in that the air tube, adaptor and electrode are each made of an electrically conductive material, that there is provided an air conduit having an electrically conductive tubular portion made of an electrically conductive material that has a downstream end portion in electrically conductive relationship to the electrode adaptor and opening through the adaptor to the air tube and an upstream end portion located in the handle chamber that is adapted for connection to a source of air and a negative terminal of an electric source of power, and an insulation portion surrounding the air conduit from closely adjacent to the air tube to the conduit upstream end portion, and that there is provided a high A.C. electrical conductor having one end electrically connected to the shell and a second end portion located in the handle chamber that is adapted for connection to a high A.C. voltage power source, the shell and nozzle being made of electrical conductive material, and the air conduit and the high A.C. electrical conductor extending through the torch body.

15. A cutting torch for discharging a heated gas, comprising a laterally elongated torch body having an upstream end portion, a downstream portion and a laterally elongated first fluid passage that includes an inlet and an outlet, a torch head mounted by the body downstream portion and having a second fluid passage that has an inlet opening to the body outlet and an outlet for discharging heated gas and a laterally elongated handle having a downstream end portion removably retained on the body upstream end portion and a laterally opposite upstream end portion, the handle including a plurality of laterally elongated section transversely separable from one another to permit transverse removable of the body from the handle sections and securable to one another to retain the handle sections to one another to retain the handle sections in fixed relationship to the body and means for securing the handle sections to one another, the handle sections having walls means defining a chamber extending axially therethrough and the body extended thereinto, the wall means including a non-circular first wall for forming a clamping fit with the laterally adjacent part of the upstream end portion of the handle to prevent rotation of the body relative to the handle while permitting transverse separation of at least one section relative to another for transverse removal of the body from at least one remaining section.

16. The plasma torch of claim 15 further characterized in that the torch head is axially elongated, has a central axis of elongation, and has a head top member, an electrode adaptor, torch head shell, each of the adaptor and shell being made of an electrically conductive material, and an insulating ring radially between the adaptor and shell, each of the top member, shell, ring and adaptor having a central axis, the adaptor extending within the ring and the shell, the ring and top member mountingly retaining the shell and adaptor in concentric relationship with their axes aligned with the torch head central axis and the ring, shell and adaptor extending below the top member, the top member and body being made of integrally joined, non-electrically conductive material and that there is provide means extending through the body and the handle for conducting gas and electricity into the torch head, including conducting electricity to the shell and the adaptor.

17. The plasma torch of claim 16 for cutting metal, further characterized in that torch head includes an annular insulating holder mounted by the shell, an electrode mounted by the adaptor and an electrically conductive nozzle mounted by the shell to extend axially more remote from the adaptor than the electrode and holder, and stand-off means mounted by the holder to maintain the nozzle a predetermined distance from the metal.

18. The torch of claim 15 further characterized in that the body upstream end portion has an elongated first part that is of substantially the same peripheral transverse size and shape throughout its length and a second part of at least one of a substantially different peripheral size and shape than that of the first part, and that the wall means includes a plurality of laterally spaced first wall parts to form a close fit with the body second part to retain the body in selected laterally adjusted positions relative to the handle before the handle sections are secured together.

19. The torch of claim 18 further characterized in that the wall sections consist of two laterally elongated half sections, each half section defining about half of the handle chamber, that the body second part in transverse cross section is generally block shape, that the body first part in transverse cross section is arcuately curved, that each of the first wall parts is generally block shaped in transverse cross section and of a size to form a closed fit with the body second part and that the wall means includes a plurality of laterally spaced second wall parts, one handle second wall part being laterally between each pair of laterally adjacent first wall parts, each second wall part being of a size and shape to form a close fit With the body first part in partial surrounding relationship thereto.

20. Plasma torch apparatus for discharging a heated gas, comprising a laterally elongated torch body having an upstream end portion, a downstream portion and a laterally elongated first fluid passage that includes an inlet and an outlet, a torch head mounted by the body downstream portion and having a second fluid passage that has an inlet opening to the body outlet and an outlet for discharging heated gas and a laterally elongated handle having a downstream end portion removably retained on the body upstream end portion and a laterally opposite upstream end portion, the handle including laterally elongated top and bottom half portions separable from one another to permit removal of the body from the handle portions in a direction perpendicular to the direction of elongation of the top and bottom half portions and securable to one another in clamping relationship to the body and means for securing the handle portions to one another and to clampingly engage the body, the handle portions having walls means defining a chamber extending axially therethrough and having the body extended thereinto for clampingly engaging the upstream end portion of the body, the torch head including a nozzle, and electrode and gas conducting means acting in cooperation with the nozzle and electrode to provide a gas flow path and discharge a plasma, the conducting means including the first and second passage, and electric means extending at least partially through the handle, through the torch body and connected to at least one of the nozzle and electrode for generating a plasma as gas discharges from the gas conducting means, and a closable trigger circuit for triggering a pilot arc, the trigger circuit including a trigger switch resiliently retained in an open position and having a manually depressible closable push button that is resiliently retained in an open condition, the trigger switch being mounted by the handle upper portion to have the its push button extending upwardly of the housing and a manually depressible interlock switch in series with the trigger switch and having a manually depressible closable push button that is resiliently retained in an open condition, the interlock switch being mounted by the handle lower portion to have its push button extending downwardly of the housing, the interlock switch push button being laterally offset from the trigger switch push button in an upstream direction sufficiently for being adapted to be pushed by the users one hand to a closed position by at least one of little finger and ring finger and the trigger switch push button to a closed position by the thumb of the one hand while the user is manually holding the torch handle with said one hand to close the trigger circuit.

21. The plasma torch apparatus of claim 20 further characterized in that there is provided a cable extending into said chamber and extending upstream from the body and encasing a part of the electrode and nozzle means, that the body is made of an electrical insulating material, that the conducting means includes a first laterally elongated electrical conductor having an uninsulated portion extending upstream of the body and located in the handle chamber and a second laterally elongated electrical conductor having an uninsulated portion extending upstream of the body and located in the handle chamber in spaced relationship to the first conductor part, the conductor parts having upstream terminal ends located in the handle chamber downstream of the cable, and that the body has an upstream end part that has a first end surface portion of a given peripheral dimension, a first electrical insulating annular flange extending upstream of the first end surface portion, surrounding the first conductor, terminating downstream of the first conductor part terminal end, and being of a smaller peripheral dimension than that of the body upstream end part, and a second electrical insulating annular flange extending upstream of the first end surface, surrounding the second conductor, terminating downstream of the second part conductor terminal end, and being of a smaller peripheral dimension than that of the body upstream end part.

22. A plasma torch comprising an axially elongated torch head having a central axis, a nozzle, an electrode, electrode and gas conducting means mounting the nozzle and electrode and acting in cooperation with the nozzle and electrode to provide a gas flow path and discharge a plasma, the conducting means including an axially extending annular shell connected to the nozzle and having first and second bore portions, the first bore portion opening to the second bore portion to form an upwardly facing interior shoulder, an electrode adaptor extending within the shell in radial spaced relationship thereto, electrically connected to the electrode and having a bore extending axially therein, and an insulating ring seatable on the shoulder for radially spacing the adaptor from the shell, each of the shell, the adaptor and the ring having a central axis, each of the adaptor and ring having a top surface and a top plastic molded member extending above the shell, ring and adaptor in engagement with therewith, including the top surface, for fixedly retaining the ring in abutting relationship to said shoulder and retaining the shell, ring and adaptor in relative fixed positions with their axles aligned with the central axis.

23. The plasma torch according to claim 22 further characterized in that there is provide second and third means connected to the shell and adaptor respectively for applying electricity across the shell and electrode, the shell being made of electrically conductive material and being electrically connected to the shell, and that the entire electrode is spaced from the nozzle.

24. The plasma torch according to claim 22 further characterized in that the adaptor has a top flange extending in abutting relationship to the ring top surface, and that the shell has interior wall means defining a third bore portion of a larger diameter than the ring and each of the first and second bore portions, including at least a radial extending protrusion radially spaced from the ring, and extending above ring and the adaptor to provide an annular gap, the top member filling the gap, including abutting against the top flange and the protrusion.

25. Plasma cutting torch apparatus comprising a torch handle, a vertical axially elongated torch head mounted by the torch handle and having a central axis, a nozzle, an electrode having a lower terminal end, electrode and gas conducting means mounting the nozzle and electrode and acting in cooperation with the nozzle and electrode to provide a gas flow path and discharge a plasma arc, the conducting means including second means for threadingly mounting the electrode and a shell having a lower end portion in radially spaced surrounding relationship to the electrode, the shell lower end portion having a lower terminal annular edge at a higher elevation than the electrode lower terminal end, the nozzle being threadedly mounted by the shell and having an annular wall in surrounding relationship to the electrode lower end portion and extending to a lower elevation than the electrode lower terminal end, each of the annular wall and electrode lower end portion having an exterior land extending to a lower elevation than the shell, a torch wrench having first wall means defining a nozzle opening of a size and shape for having the nozzle wall extended thereinto and abuttable against the nozzle land for unthreading the nozzle from the shell and second wall means defining an electrode opening of a size and shape for having the electrode lower end portion extended thereinto and abuttable against the electrode land for unthreading the electrode from the second means, and closable trigger circuit means for triggering a pilot arc, the circuit means including a trigger switch mounted by handle, resiliently retained in an open position and having a manually depressible closable switch member that is resiliently retained in an open condition, and wrench interlock switch mechanism that includes a wrench housing for at least in part housing the wrench and an interlock switch that is electrically connected in series with the trigger switch and having a switch member resiliently retained in an open condition and operable means operated by the wrench abutting thereagainst for moving the interlock switch member to its closed position while the wrench is being housed in the housing, and releasably retaining the interlock switch member in its closed position as long as the wrench is housed in the housing, the wrench housing mounting the interlock switch and having a wrench slot to have the wrench extended thereinto for operating the operable means and retaining the operable means in a position retaining the interlock switch member in its closed condition as long as the wrench is housed in the housing and permitting the interlock switch member resiliently opening when the wrench is removed from the housing.

26. A plasma torch for cutting metal, comprising a laterally elongated torch body, a laterally elongated handle for mounting the torch body and being manually moved to correspondingly move the torch body during a cutting operation, and an axially elongated plasma torch head mounted by the torch body to extend to a lower elevation than the torch body, the torch head having a central axis, a nozzle an electrode, electrode and gas conducting means mounting the nozzle and electrode and acting in cooperation with the nozzle and electrode to provide a gas flow path and discharge a plasma, the conducting means including an axially extending annular shell mounting the nozzle to extend to a lower elevation than the shell and electrode, an electrode adaptor extending within the shell in radial spaced relationship thereto, electrically connected to the electrode and having a bore extending axially therein, and insulating means mountingly retaining the adaptor radially spaced from the shell, the shell, electrode, electrode adaptor and nozzle being made of electrically conductive material, and holder means mounted by the shell for retaining the nozzle in predetermined spaced relationship to the metal while the metal is being cut, the holder means including an annular insulating holder mounted by the shell and a stand-off mounted by the holder in depending relationship thereto to maintain the holder and thereby the shell and nozzle in spaced relationship to the metal during the cutting operation.

27. A plasma torch according to claim 26 further characterized in that the stand-off has diametrically opposite legs in radial spaced relationship to the central axis that extend to a lower elevation than the nozzle to abut against the metal, and holder has means for mounting the stand-off for selected rotation about the central axes to have the legs located on opposite sides of the cutting being made in metal and substantially equal spacing relative thereto while retaining the stand-off in fixed axial relationship thereto.

28. A plasma torch according to claim 26 further characterized in that the torch body has an upstream end portion of rigid material, that there is provided an elongated flexible cable having a downstream end portion of a non-clamped relaxed peripheral dimension and an elongated handle section having a downstream end portion for clampingly engaging the torch body upstream end portion and the downstream: end portion of the cable, the handle having first and second axially elongated portions and connecting means for removably securing the handle portion in clamping engagement with the cable and torch body, the handle portions having internal surface means of am internal peripheral dimension to form a friction fit with the cable downstream end portion when the handle portions are secured to one another by the connecting means and rib means extending inwardly of the internal surface means to protrude into the cable downstream end portion to block the transference of stress on the cable through the electrical conducting means from the cable to the torch handle and electric conductive means extending through the cable, handle section and body portion for applying electric power across the adaptor and shell 29. A plasma torch according to claim 26 further characterized in that the holder is made of high temperature Teflon.

30. A plasma torch comprising an axially elongated torch head that includes an axially elongated electrode adaptor that has an entry end portion and an axially opposite end portion, the adaptor having first wall means defining a bore extending therethrough, including at least part of a first chamber portion, an axially elongated air tube, an axially elongated electrode having a first end portion and a second end portion that is mounted by the adaptor opposite end portion and in conjunction with the adaptor define at least part of a first chamber having the first chamber portion, the electrode having an elongated bore that has one end opening to the first chambers and an opposite terminal end axially remote from the adaptor, the elongated air tube having an entry end mounted by the adaptor and an axially opposite terminal end located in the electrode bore axially more closely adjacent to the electrode bore terminal end than the opening of the electrode to the first chamber, the air tube and electrode bore being of relative diameters to form an annular clearance space extending from the tube terminal end to the first chamber, an axially elongated torch head shell that includes an entry end portion, a discharge end portion having a discharge end and second wall mans in radial spaced relationship to the adaptor and at least part of the electrode to define a bore extending axially therethrough, a nozzle mounted by the shell discharge end for nearly closing the shell bore discharge end and discharging a plasma, the nozzle being radially and axially spaced from the electrode, insulation means abutting against the adaptor entry end portion and the shell entry end portion for retaining the adaptor in radial spaced relationship to the shell, the air tube, shell, nozzle, adaptor and electrode each being made of an electrically conductive material, the insulation means and at least part of at least one of the adaptor and electrode forming an axially elongated second chamber that opens the nozzle, the adaptor having at least one first passage that opens to the first chamber axially remote from the electrode and to the second chamber remote from the nozzle, the opening of the electrode bore to the first chamber being axially intermediate the air tube terminal end and said first passage and the minimum axial distance of the electrode from the first passage being less than the minimum axial distance of the nozzle from the first passage, a laterally elongated torch body that includes a downstream end portion jointed to the torch head and a laterally opposite upstream end portion, a laterally elongated handle having a downstream end portion removably retained on the body upstream end portion and a laterally opposite upstream end portion, the body upstream end portion having an elongated first part that is of substantially the same peripheral transverse size and shape throughout its length and a second part of at least one of a substantially different peripheral size and shape than that of the first part, the handle including a plurality of laterally elongated sections transversely separable from one another to permit transverse removal of the torch body from the handle sections and securable to one another to retain the handle sections in fixed relationship to the body and means for securing the handle sections to one another, the handle having walls means defining a chamber extending axially therethrough and the body extended thereinto, the wall means including a plurality of laterally spaced first wall parts to form a close fit with the body second part to retain the body in selected laterally adjusted positions relative to the handle before the handle sections are secured together, a non-circular first wall for forming a clamping fit with the laterally adjacent part of the upstream end portion of the handle to prevent rotation of the body relative to the handle, the handle sections comprising a laterally elongated top half portion and a laterally elongated lower half portion, the air conduit having an electrically conductive tubular portion made of an electrically conductive material that has a downstream end portion in electrically conductive relationship to the electrode adaptor and opening though the adaptor to the air tube and an upstream end portion located in the handle chamber that is adapted for connection to a source of air and a negative terminal of an electric source of power, and an insulation portion surrounding the air conduit from closely adjacent to the air tube to the conduit upstream end portion, a high A.C. electrical conductor having one end electrically connected to the shell and a second end portion located in the handle chamber that is adapted for connection to a high A.C. voltage power source, and the air conduit and the high A.C. electrical conductor extending through the torch body, and a manually closable trigger circuit for triggering a pilot arc, the trigger circuit including a trigger switch resiliently retained in an open position and having a manually depressible closable push button that is resilient retained in an open condition, the trigger switch being mounted by the handle upper portion to have the its push button extending upwardly of the housing and a manually depressible interlock switch in series with the trigger switch and having a manually depressible closable push button that is resiliently retained in an open condition, the interlock switch being mounted by the handle lower portion to have its push button extending downwardly of the housing, the interlock switch push button being laterally offset from the trigger switch push button in an upstream direction sufficiently for being adapted to be pushed by the users one hand to a closed position by at least one of little closed position by the thumb of the one hand while the user is manually holding the torch handle with said one hand to close the trigger circuit.

31. A plasma gas cutting torch for discharging a heated gas, comprising a laterally elongated torch body having an upstream end portion, a downstream portion and a laterally elongated first fluid passage that includes an inlet and an outlet, the body upstream end portion having an elongated first part that is of substantially the same peripheral transverse size and shape throughout its length and a second part of at least one of a substantially different peripheral size and shape than that of the first part, a torch head mounted by the body downstream portion and having a second fluid passage that has an inlet opening to the body outlet and an outlet for discharging heated gas and a laterally elongated handle having a downstream end portion removably retained on the body upstream end portion and a laterally opposite upstream end portion, the handle including a plurality of laterally elongated sections transversely separable from one another to permit transverse removal of the body from the handle sections and securable to one another to retain the handle sections to one another to retain the handle sections in fixed relationship to the body and means for securing the handle sections to one another, the handle sections having wall means defining a chamber extending axially therethrough and the body extended thereinto, the wall means including a non-circular first wall for forming a clamping fit with the laterally adjacent part of the upstream end portion of the handle to prevent rotation of the body relative to the handle wile permitting transverse separation of at least one section relative to another for transverse removal of the body from at least one remaining section, the wall means includes a plurality of laterally spaced first wall parts to form a close fit with the body second part to retain the body in selected laterally adjusted positions relative to the handle before the handle sections are secured together, the handle sections comprising a laterally elongated top handle half portion and a laterally elongated lower half potion, the torch head including a nozzle, an electrode and gas conducting means acting in cooperation with the nozzle and electrode to provide a gas flow path and discharge a plasma, the conducting means including the first and second passage, electric means extending at least partially through the handle, through the torch body and connected to at least one of the nozzle and electrode for generating a plasma as gas discharges from the gas conducting means, and a closable trigger circuit for triggering a pilot arc, the trigger circuit including a trigger switch resiliently retained in an open position and having a manually depressible closable push button that is resiliently retained in an open condition, the trigger switch being mounted by the handle upper portion to have the its push button extending upwardly of the hosing and a manually depressible interlock switch in series with the trigger switch and having a manually depressible closable push button that is resiliently retained in an open condition, the interlock switch being mounted by the handle lower portion to have its push button extending downwardly of the housing, the interlock switch push button being laterally offset from the trigger switch push button in an upstream direction sufficiently for being adapted to be pushed by the users one hand to a closed position by at least one of little finger and ring finger and the trigger switch push button to a closed position by the thumb of the one hand while the user is manually holding the torch handle with said one hand to close the trigger circuit.

* * * * *

UNITED STATES PATENT AND TRADEMARK OFFICE

CERTIFICATE OF CORRECTION

PATENT NO. : 5,039,837

DATED : August 13, 1991
INVENTOR(S) : Farhad Nourbakhsh and Corwin L. Namken

It is certified that error appears in the above-indentified patent and that said Letters Patent is hereby corrected as shown below:

In the drawings Figs. 11, 12, 13, 14 and 15 should be added as shown on the attached pages.

SW1: TRIGGER SWITCH (MOMENTARY PUSH BUTTON, NORMALLY OPEN)
SW2: LOWER HANDLE INTERLOCK SWITCH (MOMENTARY PUSH BUTTON, NORMALLY OPEN)
SW3: WRENCH INTERLOCK SWITCH (NORMALLY OPEN, LEVER SWITCH)
T1: TRIGGER SWITCH CONNECTOR
T2: POWER SUPPLY (-) CONNECTOR
T3: HIGH VOLTAGE PILOT CONNECTOR
T4: GROUND CABLE CONNECTOR

UNITED STATES PATENT AND TRADEMARK OFFICE

CERTIFICATE OF CORRECTION

PATENT NO. : 5,039,837

DATED : August 13, 1991

INVENTOR(S) : Farhad Nourbakhsh and Corwin L. Namken

It is certified that error appears in the above-indentified patent and that said Letters Patent is hereby corrected as shown below:

In the drawings Figs. 11, 12, 13, 14 and 15 should be added as shown on the attached pages.

Column 3, line 21, change "o" to --of--.

Column 5, line 7, after "electrode" insert --.--; and
line 19, change "shown" to --shown)--.

Column 6, line 5, change "1 2," to --1, 2,--;
line 37, change "see" to --(see--;
line 43, change "lateral" to --(lateral--; and
line 46, change "lateral" to --(lateral--.

Column 7, line 54, change "Cavities" to --cavities--; and
line 68, change "terminal The" to --terminal. The--.

Column 8, line 34, change "tho" to --the--;
line 51, change "71 72," to --71, 72,--; and
line 57, change "on" to --one--.

Column 9, line 52, change "for" to --(for--.

Column 12, (claim 9) line 26, change "n early" to --nearly--.

Column 14, (claim 17) line 8, after "that", insert --the--; and
(claim 19) line 40, change "With" to --with--.

Column 16, (claim 22) line 5, "axles" should be --axes--.

Column 17, (claim 28) line 53, change "downstream:" to --downstream--;
and line 68, change "shell" to --shell.--.

Column 18, (claim 30) line 16, change "chambers" to --chamber--; and
line 50, change "jointed" to --joined--.

UNITED STATES PATENT AND TRADEMARK OFFICE

CERTIFICATE OF CORRECTION

PATENT NO. : 5,039,837

DATED : August 13, 1991

INVENTOR(S) : Farhad Nourbakhsh and Corwin L. Namken

It is certified that error appears in the above-indentified patent and that said Letters Patent is hereby corrected as shown below:

Column 19, (claim 30) line 41, after "little", insert --finger and ring finger and the trigger switch push button to a--.

column 20, (claim 31) line 26, change "potion," to --portion--.

Signed and Sealed this

Twenty-second Day of February, 1994

Attest:

Bruce Lehman

BRUCE LEHMAN

*Attesting Officer* *Commissioner of Patents and Trademarks*